(12) United States Patent
Saffer et al.

(10) Patent No.: US 12,420,964 B2
(45) Date of Patent: Sep. 23, 2025

(54) APPARATUS AND METHOD FOR PACKAGING SLAB FORM OR CUBOIDAL PRODUCTS

(71) Applicant: LOESCH Verpackungstechnik GmbH + Co. KG, Altendorf (DE)

(72) Inventors: Markus Saffer, Eggolsheim (DE); Martin Becker, Forchheim (DE); Alexander Backes, Oberasbach (DE)

(73) Assignee: LOESCH VERPACKUNGSTECHNIK GMBH + CO. KG, Altendorf (DE)

( * ) Notice: Subject to any disclaimer, the term of this patent is extended or adjusted under 35 U.S.C. 154(b) by 13 days.

(21) Appl. No.: 18/040,058

(22) PCT Filed: Aug. 4, 2020

(86) PCT No.: PCT/EP2020/071914
§ 371 (c)(1),
(2) Date: Jan. 31, 2023

(87) PCT Pub. No.: WO2022/028679
PCT Pub. Date: Feb. 10, 2022

(65) Prior Publication Data
US 2023/0278735 A1  Sep. 7, 2023

(51) Int. Cl.
*B65B 25/00* (2006.01)
*A23G 7/00* (2006.01)
(Continued)

(52) U.S. Cl.
CPC ............ *B65B 11/12* (2013.01); *A23G 7/0012* (2013.01); *A23G 7/0062* (2013.01); *B65B 25/005* (2013.01); *B65B 35/20* (2013.01)

(58) Field of Classification Search
CPC ....... B65B 11/12; B65B 25/005; B65B 35/20; B65B 11/08; B65B 11/22; B65B 11/42;
(Continued)

(56) References Cited

U.S. PATENT DOCUMENTS

| | | | |
|---|---|---|---|
| 3,075,325 A * | 1/1963 | Liedtke | B65B 41/06 53/228 |
| 3,507,091 A * | 4/1970 | Gillespie | B65B 11/12 53/131.2 |

(Continued)

FOREIGN PATENT DOCUMENTS

| | | |
|---|---|---|
| CN | 101643156 A | 2/2010 |
| DE | 947538 | 8/1956 |

(Continued)

OTHER PUBLICATIONS

European Patent Office; International Search Report for PCT/EP2020/071914, Apr. 14, 2021, 5 pages.

*Primary Examiner* — Anna K Kinsaul
*Assistant Examiner* — Mobeen Ahmed
(74) *Attorney, Agent, or Firm* — Cislo & Thomas, LLP

(57) ABSTRACT

An apparatus and a method for packaging substantially plate-shaped or cuboid-shaped products in the food industry in a packaging material film, the apparatus having feeding devices for feeding products to a packaging station; guiding devices for feeding a blank of the packaging material film to the packaging station, wherein the product is inserted into the blank such that the packaging material film substantially wraps around the product; discharge devices for discharging the product from the packaging station in a wrapped state; and holding devices being movably configured and arranged to move with the product through the packaging station.

23 Claims, 5 Drawing Sheets

(51) Int. Cl.
*B65B 11/12* (2006.01)
*B65B 35/20* (2006.01)

(58) Field of Classification Search
CPC ....... B65B 41/04; B65B 41/06; A23G 7/0012; A23G 7/0062
See application file for complete search history.

(56) References Cited

U.S. PATENT DOCUMENTS

| | | | | |
|---|---|---|---|---|
| 3,589,100 | A * | 6/1971 | Konars | B65B 9/026 53/76 |
| 4,254,604 | A * | 3/1981 | Vogel | B65B 43/325 53/376.4 |
| 4,617,780 | A * | 10/1986 | Focke | B65B 51/14 53/228 |
| 4,624,096 | A * | 11/1986 | Nordstrom | B65B 51/16 53/590 |
| 5,056,294 | A * | 10/1991 | Focke | B65B 11/08 53/201 |
| 5,775,064 | A * | 7/1998 | Iwata | B65B 49/14 53/466 |
| 6,047,529 | A * | 4/2000 | Draghetti | B65B 51/02 53/466 |
| 6,067,780 | A * | 5/2000 | Gentili | B65B 25/146 53/376.2 |
| 6,328,152 | B1 * | 12/2001 | Focke | B65B 35/20 198/740 |
| 10,227,151 | B2 * | 3/2019 | Kawano | B43M 7/00 |
| 12,187,468 | B2 * | 1/2025 | Liang | B65B 11/12 |
| 2005/0097865 | A1 * | 5/2005 | Gamberini | B65B 25/146 53/466 |
| 2009/0250866 | A1 | 10/2009 | Wild et al. | |
| 2012/0241339 | A1 * | 9/2012 | Buse | B65B 19/226 206/268 |
| 2013/0291485 | A1 * | 11/2013 | McCorkle | B65B 39/02 53/473 |
| 2014/0137517 | A1 * | 5/2014 | Hammacher | B65B 11/42 53/147 |
| 2014/0260087 | A1 * | 9/2014 | Antoniazzi | B65B 25/146 53/204 |
| 2024/0383627 | A1 * | 11/2024 | Frasnetti | G06T 7/001 |

FOREIGN PATENT DOCUMENTS

| | | | |
|---|---|---|---|
| DE | 69717888 | 9/2003 | |
| DE | 202016103863 | 8/2016 | |
| DE | 102020107432 A1 * | 9/2020 | ............ B65B 11/22 |
| EP | 0031515 A1 * | 7/1981 | ............ B31B 50/16 |
| EP | 0424991 | 5/1991 | |
| EP | 0795474 | 9/1997 | |
| EP | 795474 A1 * | 9/1997 | ............ B65B 11/42 |
| WO | WO-2013088412 A2 * | 6/2013 | ............ B65B 11/42 |
| WO | WO-2023169941 A1 * | 9/2023 | ............ B65B 11/42 |

* cited by examiner

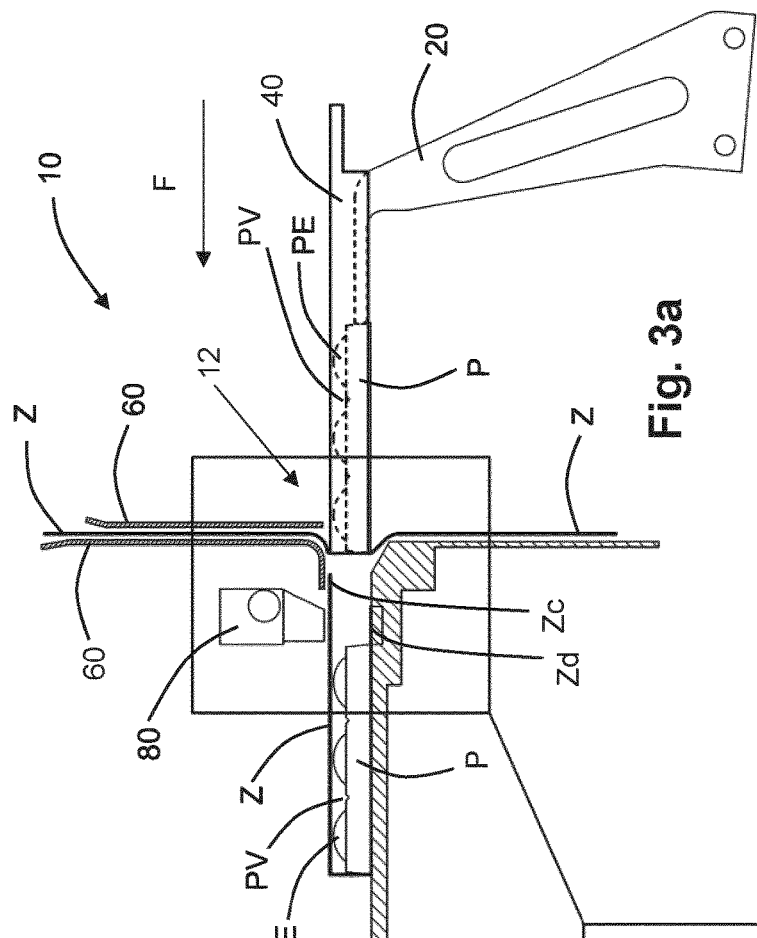
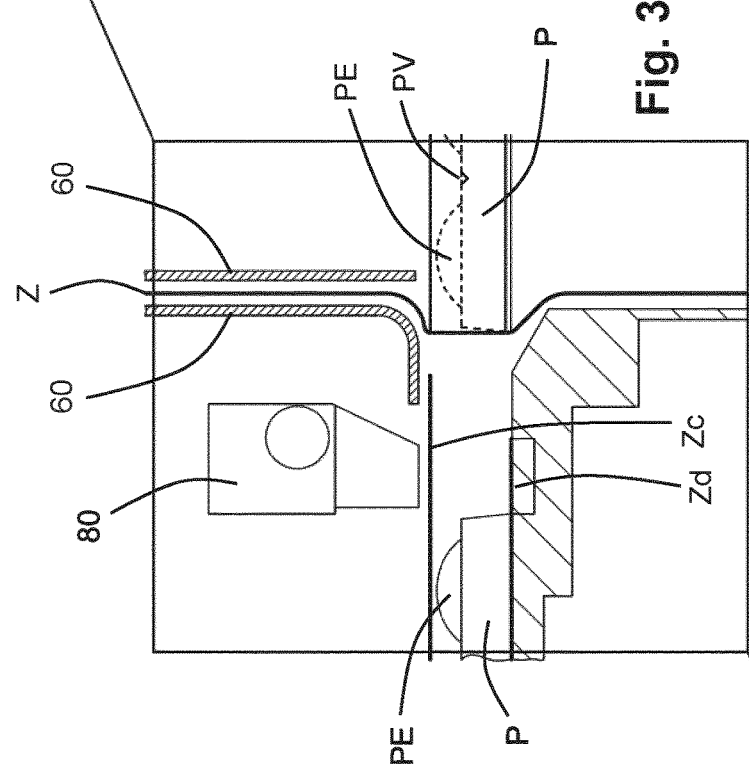
Fig. 3a
Fig. 3b

APPARATUS AND METHOD FOR PACKAGING SLAB FORM OR CUBOIDAL PRODUCTS

The invention relates to an apparatus and a method for packaging essentially plate-shaped or cuboid-shaped products, in particular products of the food industry, in particular slabs or bars consisting essentially of chocolate, in a packaging material film.

Packaging machines for packaging plate-shaped or bar-shaped products of the confectionery industry, in particular chocolate slabs or chocolate bars in different sizes, weights and formats, in particular in the common sizes from about 20 g to about 300 g per unit, are known as fold wrapping machines or film wrapping machines. Such machines have a target output range of up to 200 packaged units (slabs, bars) per minute. Herein, the products are wrapped in a packaging material film and sealed, if necessary. The materials used for these packaging films are, in particular, aluminum, paper or plastics, which may be heat-sealable or cold-sealable. The chocolate products may contain soft or hard fillings (e.g. nuts) and may have different surface textures, shapes and/or profiles. As such, the products are typically sensitive to breakage, high temperatures and/or other damage. Last but not least, the product presentation, i.e. the appearance of the packaged product, is essential from an advertising and sales point of view. The packaging machines must therefore meet these requirements reliably and at the same time flexibly with regard to any desired change in the above-mentioned parameters.

In the known packaging machines of the type mentioned above, the product (e.g. chocolate plate, chocolate bar) is typically fed, lying in a horizontal plane, to the packaging film arranged essentially perpendicular to the product conveying direction, in particular a blank of the packaging film suitable for the respective product, and is inserted therein. In this case, the packaging film forms, in a way, a film curtain in the product conveying path, with one part of the film or film blank being located above the conveying plane and another part of the film or film blank being located below the conveying plane. When the product is advanced further in the conveying direction, the packaging film essentially wraps around the product and is then advanced further in this form with the product. The film is thus pulled or folded around the product from its initial position, being substantially perpendicular to the product conveying direction, due to the forward movement of the product, and then initially lies relatively loosely against the front side, top side and bottom side of the product. The film blank is preferably dimensioned in such a way that it protrudes beyond the product on both sides and on the rear side of the product, relative to the conveying direction. These lateral and rear parts of the film blank, which therefore protrude from the top side and the bottom side of the product, are then folded further and placed one on top of the other in such a way that they can be sealed together with suitable sealing devices to respectively form a sealed seam. In this way, the product is ultimately completely surrounded by the packaging film, so that a more or less tight package is formed by means of the sealing seams produced on both sides and on the back of the product.

In a packaging machine operating in this way, the individual product is typically fed continuously to the film curtain and inserted into it by means of suitable feed devices, e.g. feed slides or carrier belts. Alternatively, the feed devices can also operate intermittently. As long as the feed devices engage with the product and advance it, thus keeping it under control, the product has a defined position, orientation and speed. However, the feed devices typically release the product as soon as the film blank has completely wrapped around the product and before the package is closed by means of the sealing seams, in particular before a longitudinal sealing seam running transversely to the conveying direction is created in the film for this purpose at the rear side of the product, relative to the conveying direction. In this phase, it must be avoided that corresponding sealing devices, in particular longitudinal sealing devices, collide with the product feeding devices. In addition, a collision of the product feeding devices pushing the product into the film curtain with the next film blank to be provided for the subsequent next product must be avoided.

After the feeding devices have thus released the product, the product is transferred to discharge devices provided downstream in the conveying direction, which convey the product further. Here, the respective film blank remains placed around the product. In particular, the film blank is initially folded loosely or loosely or unattached around the product before the above-mentioned lateral sealing seams and the rear longitudinal sealing seam are formed in the film. As long as these sealing seams have not yet been formed, the product and the relevant film blank can therefore move relative to each other, in particular be displaced relative to each other. Only when all the above-mentioned sealing seams have been sealed and the package has thus finally been completely closed is the product finally fixed in position within the film blank, i.e. the product and the film can then essentially no longer move relative to one another.

The product discharge devices can typically be conveyor rakes that move back and forth in the conveying direction. They engage, for example, from above in between two successive products and respectively grasp the products from behind, thus pushing them further in the conveying direction. At the end of a conveying stroke, the conveyor rake lets go of the advanced products and moves back in the opposite direction to the conveying direction to a position in which it can particularly grasp a subsequently fed next product. In the phase of this backward stroke of the conveyor rake, the products are thus not pushed further but stand still. Such product discharge devices thus typically operate intermittently. Alternatively, however, it is also possible for the discharge devices to operate continuously, e.g. by using carrier belts.

In the phase of transfer or conveyance of the products from the input-side feeding devices to the output-side discharge devices, the individual product is thus typically neither under the control of the feeding devices nor under the control of the discharge devices, i.e. the product is here temporarily not held and guided by any of these devices. In addition, the conveyed product is alternately slowed down and then accelerated again when it is transferred from continuously operating feeding devices to intermittently operating discharge devices. The latter also applies to the product in the course of the intermittent conveying through the discharge devices alone (for example conveying rakes) as described above.

In this phase of an uncontrolled, possibly also alternately braked and re-accelerated conveying of the products, the individual product can shift in its conveying path, so that it may not be taken over in an aligned and positionally accurate manner by the subsequent conveying and/or processing equipment. In addition, the film blank, which typically still lies loose, i.e. not fixed, around the product here, can move relative to the product during this phase. In particular, the product and the film blank can thus slip or shift or displace relative to each other.

It is understood that such uncontrolled movements of the product and/or the film blank are disadvantageous and undesirable for production engineering reasons. Accordingly, products that are not positioned and conveyed accurately can be damaged by the downstream conveying and/or processing equipment or, in the worst case, even lead to machine blockages and downtimes. A correct alignment of the respective film blank with respect to the individual product is required in particular in order to form a correctly closed, possibly tight packaging unit, for example by producing correct and clean sealing seams, for which purpose it is necessary, among other things, that the relevant edges or sections of the film blank to be sealed together lie correctly one above the other and on top of each other. Furthermore, for a perfect optical appearance of the final packaged product, a correct alignment of the respective film blank with respect to the individual product is required, since, for example, labels and/or illustrations applied to the visible outer side of the film must match the respective product shape or format.

In an attempt to eliminate the problems described above and in particular to ensure that the individual product does not shift in its conveying path and/or that the product and the film blank do not shift relative to one another, it is known in the prior art to provide a stationary holding device for the product essentially in the area of the product conveying path in which the product is transferred from the infeed devices on the input side to the discharge devices on the output side and in which the product is typically neither under the control of the infeed devices nor under the control of the discharge devices as described above. Therein, this known holding device is typically arranged in an area in the conveying direction behind the film curtain and/or in front of the discharge devices (e.g. conveyor rakes). This holding device is e.g. in the form of a brush arranged above the conveyor path and is designed to act on the product in the form of a counterholder and to keep it under control. In particular, the holding device engages from above on the outside of the film lying around the product after it has been inserted into the film curtain. Thus, the holding device does not touch the product directly, but rather holds it indirectly through the film. This is to ensure that neither the product as such nor the product and the film shift relative to each other, so that the product and the film remain properly aligned relative to each other and in the conveyor path.

In practice, however, it has been shown that the above-described holding device cannot accomplish the desired purpose of a safe and correctly aligned conveyance of the product and the film. In particular, however, this known holding device is also unsuitable for a gentle conveying of the sensitive products (e.g. chocolate bars, as described at the beginning) because, among other things, it exerts too much pressure on the product. For example, the known holding device is particularly unsuitable in cases where the product as such has a profiled surface structure, as it can press the packaging film lying over the product into recessed areas of the product surface, which are located next to raised areas on the product surface. In addition to the risk of tearing of the packaging film in these areas, this can lead to a disorderly, uneven and therefore visually unattractive product packaging. However, this is particularly disadvantageous if it is desired that the product packaging has a uniform, smooth or even surface, even if the product as such has a structured or profiled surface.

The invention is thus based on the problem of creating an improved apparatus and a corresponding method for packaging plate-shaped or cuboid products, in particular slab-shaped or bar-shaped products of the confectionery industry, in particular chocolate tablets or chocolate bars, in a packaging material film. The aim is to overcome the problems described above and, in particular, to ensure that the product and a film blank folded around the product are always kept under control in such a way that the individual product does not shift in its conveying path and/or that the product and the film blank folded around the product do not slip relative to one another when the product is transferred from input-side feed devices to output-side discharge devices in a phase in which the film blank is folded around the product. This controlled guiding of the product and the film blank is furthermore to be realized in particular for products which as such have a structured or profiled surface, for example in such a way that recessed areas are present next to raised areas on the product surface. Finally, the product and the finished packaging unit formed from the product and the packaging film are to be conveyed gently in all phases of processing in order to avoid damage to the product or the finished packaging.

The invention thus provides an apparatus for packaging essentially plate-shaped or cuboid-shaped products, in particular products of the food industry, in particular slabs or bars consisting essentially of chocolate, in a packaging material film, having the following features: Feeding devices for feeding one product at a time to a packaging station in a conveying direction in a conveying plane; devices for providing in the packaging station a blank of the packaging material film matching the respectively fed product, the blank of the packaging material film being fed into the packaging station in a direction essentially perpendicular to the conveying direction; said feeding devices being configured and arranged to convey said product, respectively, at least partially through said packaging station such that said product is inserted into said blank of said packaging material film in the conveying direction such that said packaging material film substantially wraps around said product; discharge devices for discharging the product from the packaging station in the conveying direction, wherein the respective blank of the packaging material film remains wrapped around the product; and holding devices being movably configured and arranged to move at least partially in the conveying direction with the product through the packaging station, wherein they hold the respective blank of the packaging material film being wrapped around the product in a predetermined orientation and arrangement with respect to the respective product.

According to the invention, it is thus provided that feeding devices push the product in the conveying direction into a blank of the packaging material film, which is initially arranged as a vertical film curtain in the conveying path. The film blank is thereby deflected in the conveying direction and wraps around the product. Together with the product, holding devices are pushed into the film blank in the conveying direction so that the film blank also wraps around the holding devices. Therein, the holding devices are designed to hold the film blank in a predetermined orientation and arrangement with respect to the product while the product continues to move in the conveying direction. The holding devices thus always keep the film blank being placed around the product under control during the transfer of the product from the input-side feeding devices to the output-side discharge devices in such a way that the film blank cannot slip relative to the product.

Preferably, the holding devices are also designed to hold the product in a predetermined orientation and arrangement with respect to the conveying plane while the product is conveyed further. The holding devices thus keep the product under control in such a way that the product as such or together with the film blank placed around it cannot slip into an undesirable or unsuitable position in the conveyor path. In particular, it is here intended that the holding devices do not engage with the product as such and do not touch it, but only engage with the film blank. The holding devices therefore do not hold the product directly but only indirectly via the film blank. In particular, the holding devices can here hold the product indirectly in that the product is virtually clamped or fixed in the film blank, which is placed around the product and held by the holding devices. Alternatively, however, it is also conceivable that the holding devices engage directly with the product as such and thereby hold it in a predetermined orientation and arrangement with respect to the conveying plane and/or conveying direction while the product is being conveyed further.

In an advantageous embodiment of the invention, the holding devices are arranged substantially in the conveying plane next to the product on at least one, but preferably on both, of the sides of the product extending substantially in the conveying direction. Here, the holding devices preferably have a height perpendicular to the conveying plane which substantially corresponds to the height of the product perpendicular to the conveying plane, e.g. the thickness of a chocolate bar to be packaged. In this way, it can be achieved that the film blank, which is placed around the product and the holding devices respectively arranged laterally thereof, lies substantially flat over its entire width in a plane on the upper side and the lower side of the product and the holding devices. If the product as such has a structured or profiled surface, in which, for example, recessed areas are present next to raised areas on the product surface, the holding devices preferably have a height perpendicular to the conveying plane which substantially corresponds to the maximum height of the product perpendicular to the conveying plane, i.e., for example, the greatest thickness of a chocolate bar to be packaged in the area of the raised sections or areas on the product surface.

In order for the holding devices to engage and hold the film blank, it is advantageously provided that the film blank is dimensioned and arranged with respect to the product in such a way that it projects beyond the product on each of the two sides of the product with a part perpendicular to the conveying direction, i.e. in the lateral direction. The holding devices then preferably each have a width in the conveying plane which essentially corresponds to the width of the respective part of the film blank which projects laterally beyond the product.

It can be seen that in the arrangement described above the holding devices together with the product are preferably inserted into the blank of the packaging material film in the conveying direction in such a way that the packaging material film is essentially laid or folded around the holding devices and around the product such that a part of the film blank, with respect to the conveying plane, lies substantially on the upper side of the product and of the holding devices arranged laterally adjacent thereto, that a part of the film blank, with respect to the conveying plane, lies substantially on the lower side of the product and of the holding devices, and that a part of the film blank, with respect to the conveying direction, lies substantially on the front side of the product and of the holding devices.

Preferably, the blank of the packaging material film is dimensioned and is arranged and guided in the packaging station in such a way that at the end of the path of insertion of the respective product and its associated holding devices into the film blank, i.e. at the end of a respective insertion stroke in the conveying direction, in each case a part of the blank projects essentially rearwardly beyond the product in extension of the part of the blank lying on the upper side of the holding devices and of the product and in extension of the part of the blank lying on the lower side of the holding devices and of the product with respect to the conveying direction. In order that, after the product has been completely inserted into the film blank, the longitudinal sealing seam of the package already mentioned at the beginning can be formed on the rear side of the product, it is advantageous if, at the end of the respective insertion stroke, one of the above-mentioned parts of the film blank projecting rearwardly beyond the product is longer and/or projects rearwardly further beyond the product than the other part of the film blank projecting rearwardly beyond the product.

In an advantageous embodiment of the invention, the holding devices comprise vacuum means or suction means for generating a negative pressure on the packaging material film in such a way that the packaging material film, which at least partially wraps around the holding devices when the latter are inserted into the film blank, is sucked by the holding devices. For this purpose, the holding devices have a connection and a channel for sucking off air as well as openings for sucking the packaging material film. These openings are arranged at the upper side and/or the lower side and/or the front side of the holding devices.

According to a further advantageous embodiment of the invention, at least one sealing device is provided for sealing together at least two parts of the blank of the packaging material film projecting beyond the product, forming a sealing seam, in such a way that the product is at least partially enclosed and packaged in the packaging material film. In particular, a longitudinal sealing device is arranged behind or downstream of the packaging station in the conveying direction, which is designed to produce a longitudinal sealing seam running perpendicular to the conveying direction and parallel to the conveying plane in two parts or sections of the packaging material film lying on top of or above one another, preferably on the back side of the product packaging. Here, in particular, the two parts of the film blank projecting rearward beyond the product at the end of a respective insertion stroke are sealed together essentially over the entire width of the packaging material film. Preferably, the longitudinal sealing seam formed then extends, to a certain extent in the form of a fin or a flap, essentially as an extension of either the upper side or the lower side of the product to the rear in relation to the conveying direction. To form this longitudinal sealing seam, the longer film section which projects further backwards beyond the product at the end of a respective insertion stroke is essentially folded around the relevant rear edge of the product and placed on the other, shorter film section which projects backwards. The longer film section is folded in such a way that ultimately a part of it lies substantially against the rear side of the product with respect to the conveying direction.

According to still another advantageous embodiment of the invention, the holding devices are movably designed and arranged in such a way that, after complete insertion in the conveying direction into the film blank, i.e. at the end of a respective insertion stroke, they are moved back into their initial or starting position upstream of the packaging station, essentially in the opposite direction to the conveying direction, for a subsequent next product to be packaged. For this purpose, the holding devices are preferably movably configured and arranged in such a way that they do not collide with the longitudinal sealing device during their movement back to their initial position. This applies in particular to the case where the longitudinal sealing device forms the longitudinal sealing seam on the back side of the product more or less immediately after the respective insertion stroke or at the end of the respective insertion stroke of the holding devices.

In order to avoid a collision between the holding devices and the longitudinal sealing device, the holding devices are preferably movably configured and arranged in such a way that, after complete insertion in the conveying direction into the film blank, they first move substantially perpendicularly to the conveying direction in or parallel to the conveying plane laterally outwardly away from the product and that they then move substantially opposite to the conveying direction back into their starting position upstream of the packaging station. The holding devices and the longitudinal sealing device are therein further preferably configured and arranged such that the longitudinal sealing device forms the longitudinal sealing seam substantially over the entire width of the packaging material film as soon as or after the holding devices have moved substantially perpendicular to the conveying direction in the conveying plane substantially completely out of the area of the packaging material film.

As indicated above, various embodiments of the invention may provide that the feeding devices feed successive products to the packaging station either intermittently or continuously, and that the discharging devices discharge the products with the packaging film wrapped around the products from the packaging station either intermittently or continuously. For this purpose, the feeding devices and/or the discharging devices can be reciprocating (with respect to the conveying direction) or circulating pusher devices or rake conveyor devices or circulating belt or chain conveyor devices with carriers or corresponding other devices which, with respect to the conveying direction, engage the rear side of the product for feeding the respective product to the packaging station or for discharging the respective product from the packaging station.

According to still another advantageous embodiment of the invention, the packaging material film is fed to the packaging station as an endless sheet. In this case, the devices for feeding the packaging material film or for providing a respective blank of the packaging material film which is suitable for the product to be packaged have cutting devices which in each case cut off the individual film blank from the endless sheet which is suitable for the product.

Finally, the invention provides a method for packaging the above-described products, for example chocolate slabs or bars. Therein, this method is carried out using an apparatus comprising the features described above.

Further details and advantages of the invention will be apparent from the following detailed description of embodiments of the invention with reference to the accompanying drawings.

FIG. 3a shows a first embodiment of a packaging apparatus according to the invention in a side view.

FIG. 3b shows an enlarged detail of the packaging apparatus of FIG. 3a.

FIG. 4b shows an enlarged detail of the packaging apparatus of FIG. 4a.

FIG. 5b shows an enlarged detail of the packaging apparatus of FIG. 5a.

Figure 1:
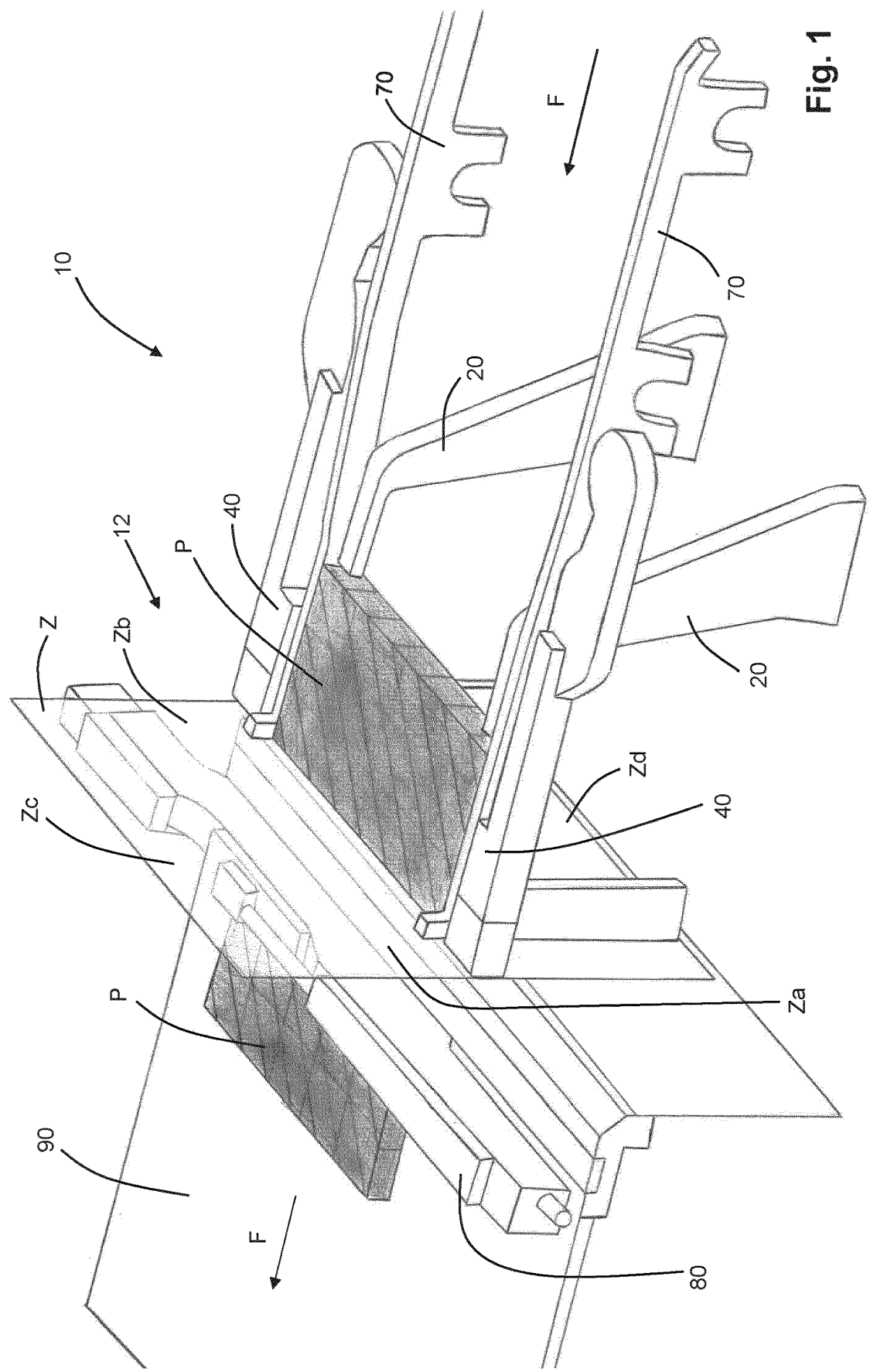
FIG. 1 shows a packaging apparatus according to the invention in a first position in a perspective view from obliquely above.

An apparatus 10 for packaging substantially plate-shaped or cuboid-shaped products P in a packaging material film Z is shown schematically in FIG. 1. The product P here is, for example, a rectangular chocolate plate. In principle, however, any other formats or sizes of the products P are conceivable, for example also essentially round or partially round or oval shapes.

The product P is fed in a conveying plane in a conveying direction F to a packaging area or a packaging station 12. The chocolate bar shown in FIG. 1 is fed here, for example, lying flat, with one of the two wider edges of the plate running ahead in the conveying direction F and the other of the two wider edges of the plate running behind in the conveying direction F, while the two shorter edges of the plate are each arranged laterally. In the region of the two shorter edges of the plate, the plate is respectively guided by lateral guides 70. These side guides 70 serve to keep the product P correctly laterally aligned in the conveying plane transverse to the conveying direction F.

For this feeding of the product P to the packaging station 12, feeding devices 20 are provided, which are exemplarily shown as pushing devices in FIG. 1. These pusher devices 20 are mounted, for example, on circulating belt or chain conveyors in such a way that they pivot out of the conveying plane at the end of the process of feeding the product P to the packaging station 12, i.e. at the end of their feed stroke, for example by dipping downwards. The pusher devices 20 then run back in the opposite direction to the conveying direction F to their starting position, in which they can pick up a next product P and again feed it to the packaging station 12. Instead of the feed pusher devices or feed pushers 20 shown, however, other types of feed devices are also conceivable, for example other circulating belt or chain conveyor devices with carriers or rake conveyor devices moving back and forth essentially linearly in the conveying direction F.

As can further be seen in FIG. 1, a blank Z of a packaging material film suitable for the supplied product P is provided in the packaging station 12 in an orientation substantially perpendicular to the conveying direction F and the conveying plane.

Corresponding devices for feeding and providing the film blank Z are not shown in FIG. 1 for reasons of simplification. FIGS. 3a to 5b show guide devices 60, in particular guide plates, which may be part of the devices for feeding and providing the film blank Z. Typically, the packaging material film is fed as an endless sheet from above to the packaging station 12. By means of suitable cutting apparatuses (not shown in the drawings), a film blank Z suitable for the respectively supplied product P is here then respectively cut from the endless film sheet. Alternatively, it is also conceivable that the packaging material film is fed as an endless sheet from one side to the packaging station 12. As a further alternative, it is conceivable that film blanks Z already produced elsewhere and held ready in a storage magazine are each fed individually, e.g. from above or from the side, successively to the packaging station 12.

As FIG. 1 further shows, the packaging material film blank Z is so dimensioned that the supplied product P can be completely packaged therein. The product P is subsequently wrapped in the film blank Z as it is further conveyed through the packaging apparatus 10, the edges of the film blank Z then being sealed together to form sealing seams, ultimately to form a fully closed, more or less tight package for the product P. As can be seen in FIG. 1, the film blank Z has a greater width than the product P transverse to the conveying direction F. The film blank Z also has a greater height above and below the conveying plane, respectively, perpendicular to the conveying plane than corresponds to the width of the product P in the conveying direction F. Thus, when the film blank Z is subsequently folded around the product P, the edge regions of the blank Z protrude beyond the edges of the product P. These protruding edge areas are then folded further in a suitable manner and placed on top of each other in order to create the sealing seams here for closing the package.

Figure 2:
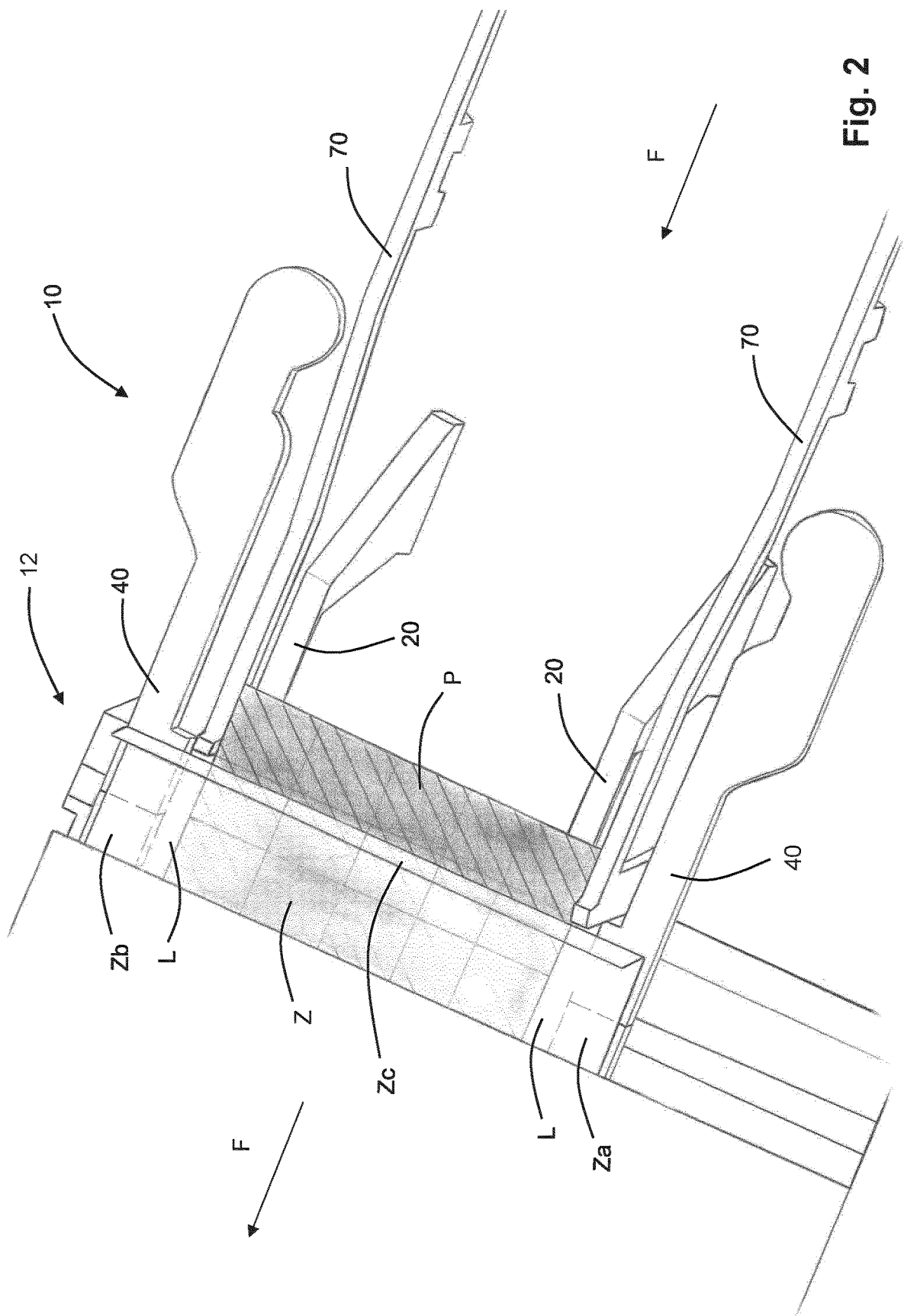
FIG. 2 shows the packaging apparatus from FIG. 1 in a second position in a perspective view from above.
Figure 4A:
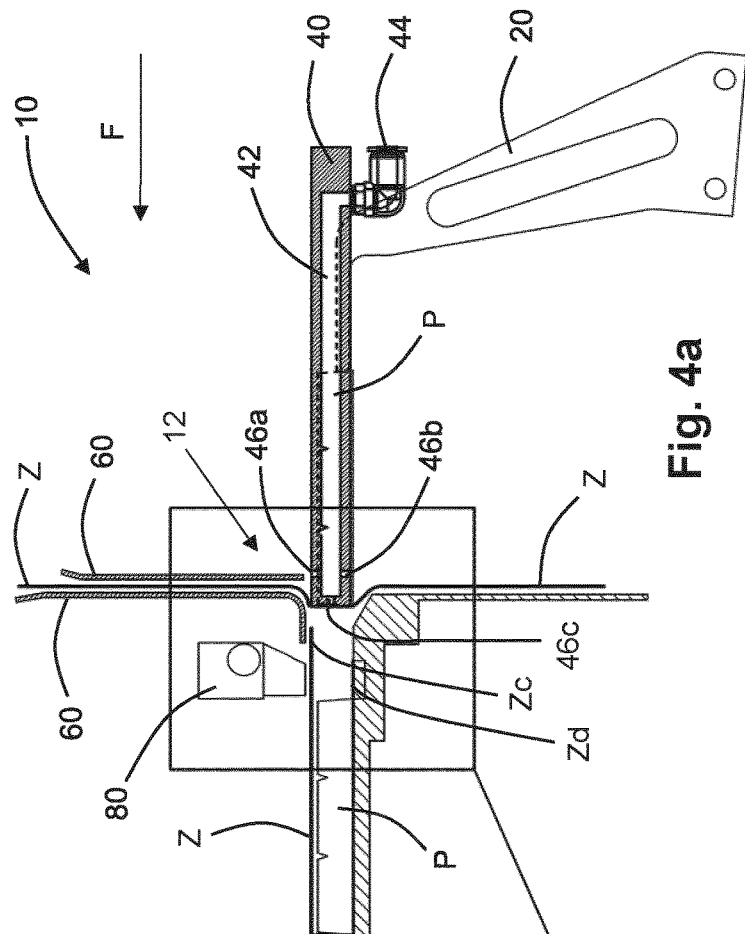
FIG. 4a shows a second embodiment of a packaging apparatus according to the invention in a first position in a side view partially in section.
Figure 4B:
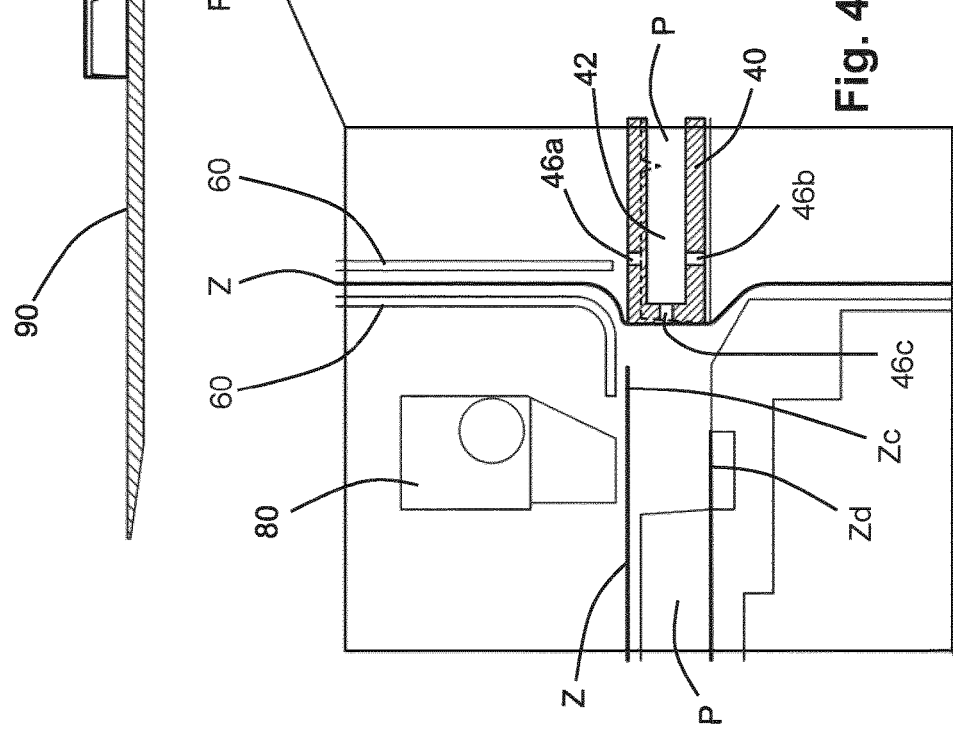

The packaging material film blank Z provided in this way forms a film curtain arranged substantially perpendicular to the conveying plane and the conveying direction F in the conveying path of the product P. In the representation of FIG. 1, the product P has already been advanced by the feed pusher 20 so far that it just abuts against this vertical film curtain. When the product P is then pushed further by the feed pushers 20 in the conveying direction F, it is pushed into the film curtain, causing the latter to be deflected in the conveying direction F, as shown in FIG. 2. Therein, the packaging film Z essentially wraps itself around the product P and is then pushed further with the product P in this form. Due to the forward movement of the product P, the film Z is thus pulled or folded around the product P from its initial substantially vertical arrangement and then lies relatively loosely against the front side, the top side and the bottom side of the product P, with respect to the conveying plane and the conveying direction F.

The feed pushers 20 typically continue to push the product P in the conveying direction F until the film blank Z has completely wrapped around the product P, i.e., until the film blank Z has been pulled from the initial completely vertical arrangement (see FIG. 1) and the subsequent partially vertical arrangement (see FIG. 2) into a substantially completely horizontal arrangement on the top and bottom sides of the product P. The feed pushers 20 then release the product P and run back to their initial position upstream for a next product P to be packaged. The feed pushers 20 cannot push the product P further in the conveying direction F in particular because a longitudinal sealing device 80 is arranged downstream at or behind the packaging station 12 (see FIG. 1), by means of which a longitudinal sealing seam running transversely to the conveying direction F is produced in the film Z or in two film sections lying above and/or on top of one another at the rear side of the product P or of the product package to be formed, relative to the conveying direction F. Here, a collision between the longitudinal sealing device 80 and the feed pushers 20 must be avoided. In addition, a collision of the feed pushers 20 with the next film blank Z to be provided for the subsequent next product P must be avoided.

After the feed pushers 20 have thus released the product P, the product P is transferred to discharge devices 90 provided downstream in the conveying direction F, which discharge the product P from the packaging station 12 and subsequently convey it further downstream. Here, the respective film blank Z remains placed around the product P. The ahead running product P downstream of the packaging station 12 and downstream of the longitudinal sealing device 80 shown in the left part of the apparatus of FIG. 1 is shown here only schematically without the film blank Z which in this position of the product P would actually be laid around the product P.

In the drawings, the discharge devices 90 are shown only schematically, for example as a conveyor track or conveyor surface 90. Typically, the discharge devices 90 may be conveyor rakes that reciprocate substantially linearly along a substantially rectangular path in the conveying direction F. Therein, the conveyor rakes engage, for example, from above in-between two successive products P and grip the products P each from behind, thereby pushing them onward in the conveying direction F. At the end of its conveying stroke, the conveyor rake lets go of the advanced products P and moves back in the opposite direction to the conveying direction F to a position in which it can respectively grasp a subsequently fed next product P. Instead of conveyor rakes, other types of discharge devices are also conceivable, for example revolving belt or chain conveyor devices with carriers.

As was explained at the outset with reference to the prior art, in the phase of the transfer or conveyance of the products P from the input-side feed devices 20 to the output-side discharge devices 90 in the region of the packaging station 12, the individual product P may be temporarily neither under the control of the feed devices 20 nor under the control of the discharge devices 90, i.e. the product P is here temporarily not held and guided by any of these devices. In addition, there may be a situation in which the conveyed product P is alternately decelerated and then accelerated again, for example when it is transferred from continuously operating feed devices 20 (e.g. feed pushers) to intermittently operating discharge devices 90 (e.g. conveyor rakes). In this phase of such uncontrolled conveying of the products P, the individual product P may shift in its conveying path, which may be detrimental or harmful for subsequent processing steps. Furthermore, in this phase the film blank Z, which here typically still lies loosely, i.e. not fixed, around the product P, can move relative to the product P, in particular shift, which possibly causes the disadvantages described at the beginning.

In order to avoid such disadvantages of the prior art, the present packaging apparatus 10 comprises, in particular, holding devices 40 which are movably configured and arranged in such a way that they move at least partially in the conveying direction F with the product P through the packaging station 12. The holding devices 40 therein hold the respective film blank Z placed around the product P in a predetermined orientation and arrangement with respect to the respective product P, while the product P continues to be moved in the conveying direction F. As FIGS. 1 and 2 show, for this purpose, the holding devices 40 are arranged and are inserted into the film blank Z together with the product P in the conveying direction F in such a way that the film blank Z also wraps around the holding devices 40. The holding devices 40 thus always keep the blank Z of the packaging material film placed around the product P under control during the transfer of the product P from the infeed devices 20 on the input side to the discharge devices 90 on the output side in such a way that the film blank Z cannot shift relative to the product P. The holding devices 40 can thus also be referred to as packaging material formers.

Preferably, the holding devices 40 may also be configured to also hold the product P as such in a predetermined orientation and arrangement with respect to the conveying plane while the product P is conveyed through the packaging station 12. In this case, however, the holding devices 40 preferably do not engage directly with the product P as such and do not touch it, but only engage with the film blank Z which is placed around the product P. The holding devices 40 thus hold the product P only indirectly under control, in that the product P is clamped or fixed in the film blank Z assigned to it. The product P together with the film blank Z placed around it can thus not slip into an undesired position in the conveyor path.

FIGS. 3a, 3b, 4a, 4b, 5a and 5b show the packaging apparatus 10 represented in FIGS. 1 and 2 with further details and in various positions and embodiments. In this respect, what has been said above with respect to FIGS. 1 and 2 also applies to these Figures.

FIGS. 3a, 3b, 4a and 4b show in their respective right-hand area, i.e. before or upstream in the packaging station 12, an in-fed product P with its associated feed pushers 20 and holding devices 40 in a position almost corresponding to the position shown in FIG. 1, but actually shortly after the position of FIG. 1. The product P and the holding devices 40 are here already slightly inserted into the film blank Z, so that the latter is already somewhat deflected in the conveying direction F.

In the respective left-hand area of FIGS. 3a, 3b, 4a and 4b, i.e. behind or downstream in the packaging station 12, the respective preceding or ahead running product P can be seen with a film blank Z completely laid or folded around this product P. Following this shown position of the preceding product P, a longitudinal sealing seam is formed in the film blank Z on the rear side of the product P, as seen in the conveying direction F, by the longitudinal sealing device 80 sealing the two rearwardly projecting edges of the film blank Z to each other. However, substantially up to or shortly before the time at which the longitudinal sealing seam is formed, the film blank Z is held and fixed by the holding devices 40 with respect to the respective preceding product P in such a way that it cannot shift or slip relative to said product P. The holding devices 40 holding this film blank Z in relation to the respective preceding product P can be seen in particular in FIGS. 5a and 5b.

Figure 5A:
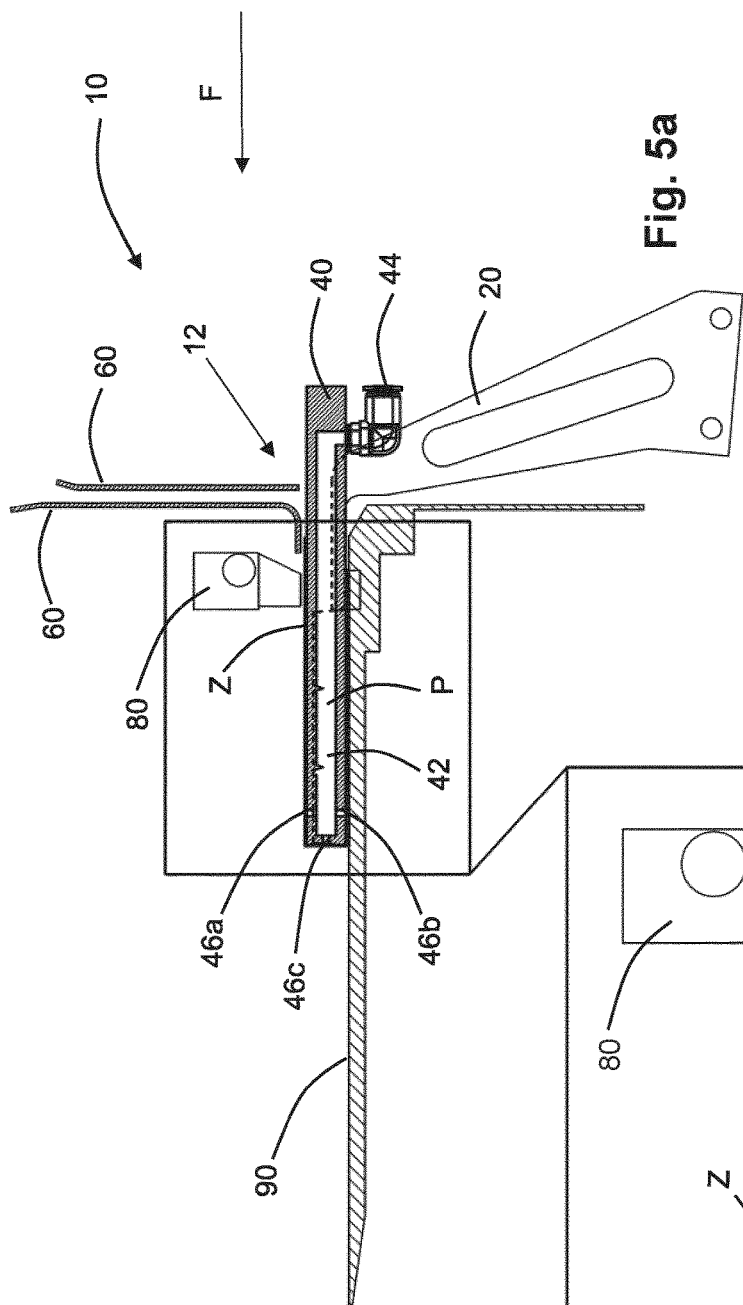
FIG. 5a shows the packaging apparatus of FIG. 4a in a second position in a side view partially in section.
Figure 5B:
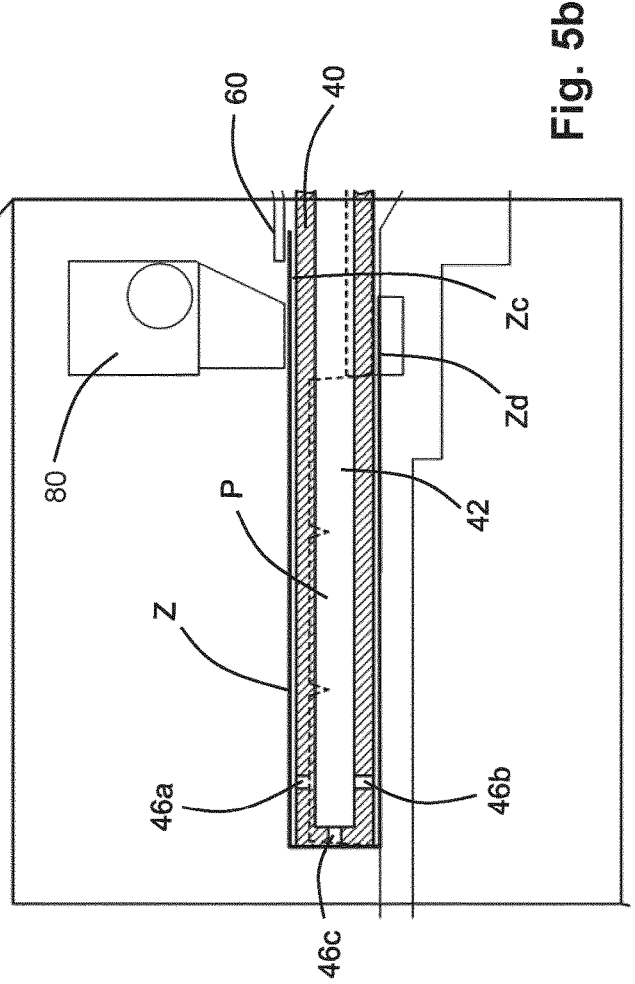

FIGS. 5a, 5b show the supplied product P with its associated feed pushers 20 and holding devices 40 in a position which follows the position shown in FIG. 2. In particular, FIGS. 5a, 5b show the fed product P in a position in which it is fully inserted into the film blank Z. Thus, this position corresponds to the position of the product P shown in the respective left-hand region of FIGS. 3a, 3b, 4a and 4b, in which the respective film blank Z is completely wrapped or folded around the product P.

FIGS. 5a, 5b also show, in particular, the holding devices 40 which hold and fix the film blank Z with respect to the concerned product P. Immediately following the position shown in FIGS. 5a, 5b, the holding devices 40 release the film blank Z and move laterally away from the product P and out of the conveying plane to return, substantially opposite to the conveying direction F, to their initial position in which they are ready for a subsequent next product P with the associated film blank Z. As soon as the holding devices 40 have moved away from the product P with its film blank Z, the longitudinal sealing device 80 can form the longitudinal sealing seam in the film blank Z on the rear side of the product P, as explained above with respect to the arrangement of the product P with the film blank Z in the respective left-hand area of FIGS. 3a, 3b, 4a and 4b. It is essential here that the movements or paths of movement of the holding devices 40 and the longitudinal sealing device 80 are controlled, arranged and coordinated with one another in such a way that the holding devices 40 do not collide with the longitudinal sealing device 80.

As shown particularly in FIGS. 1 and 2, the holding devices 40 are arranged in the conveying plane next to the product P on the two sides of the product P extending in the conveying direction F. It is also conceivable to have an embodiment in which the holding devices 40 are arranged only on one side of the product P. As can also be seen from FIGS. 1 and 2, the holding devices 40 are arranged laterally outside the side guides 70, so that the holding devices 40 do not touch the product P. Since the side guides 70 are typically fixed or stationary, a gap L is respectively created downstream of the side guides 70 between the sides of the product P and the respective holding devices 40 arranged laterally outside thereof when the holding devices 40 are inserted into the film blank Z together with and/or parallel to the product P (see FIG. 2). This gap L contributes to the fact that the holding devices 40 have no contact with the product P. This prevents, among other things, damage to the product P by the holding devices 40.

As can be seen in particular from FIGS. 3a to 5b, the holding devices 40 have a height perpendicular to the conveying plane which corresponds substantially to the height of the product P perpendicular to the conveying plane. This ensures that the packaging film Z held by the holding devices 40 and folded around the product P lies substantially close to or on the respective surfaces of the product P. In the case shown in FIGS. 3a and 3b, where the product P has a surface profiled with elevations PE and recesses PV, the holding devices 40 have a height perpendicular to the conveying plane substantially corresponding to the maximum thickness of the product P in the region of the elevations PE. Accordingly, the packaging film Z is virtually stretched by the holding devices 40 between each two adjacent elevations PE flat or even over the recess PV lying between them.

The blank Z of the packaging material film is typically dimensioned and arranged with respect to the product P in such a way that it projects laterally, i.e. perpendicularly to the conveying direction F, beyond the product P on each of the two sides of the product P extending in the conveying direction F with a part or section Za, Zb (see FIGS. 1 and 2). The holding devices 40 typically each have a width in the conveying plane substantially corresponding to the width of the respective part Za, Zb of the film blank Z projecting laterally beyond the product P. In the case that downstream of the side guides 70 a gap L is formed between the product P and the respective holding device 40 arranged laterally thereof, the width of the film section Za, Zb projecting laterally beyond the product P essentially corresponds to the sum of the width of the respective holding device 40 and the width of the gap L, in each case as seen in the conveying plane perpendicular to the conveying direction F (see FIG. 2).

As already explained above, the holding devices 40 are inserted together with the product P in the conveying direction F into the blank Z of the packaging material film. In this process, the packaging material film Z essentially wraps around the holding devices 40 and around the product P in such a way that a part of the film blank Z lies essentially on the top side of the holding devices 40 and of the product P with respect to the conveying plane, that a part of the film blank Z lies essentially on the underside of the holding devices 40 and of the product P with respect to the conveying plane, and that a part of the film blank Z lies essentially on the face side or front side of the holding devices 40 and of the product P with respect to the conveying direction F.

At the rear side of the product P, with respect to the conveying direction F, the packaging material film Z therein does not initially lie against it, i.e. the rear side of the product is open (see, for example, product P in the respective left-hand region of FIGS. 3a to 5b). Likewise, the packaging material film Z here does not initially lie against the two narrow side surfaces of the product P extending in the conveying direction F (see e.g. FIG. 2).

The film blank Z is dimensioned such that at the end of the insertion stroke of the holding devices 40 and the product P in the conveying direction F into the film blank Z, i.e. when the film blank Z has been drawn from its initial vertical arrangement as a film curtain in the conveying path (see FIG. 1) into the position in which it lies completely around the product P, individual parts or sections Zc, Zd of the film blank Z project substantially rearwardly beyond the product P with respect to the conveying direction F, namely a film section Zc in extension of the part of the blank Z lying on the upper side of the holding devices 40 and of the product P, and another film section Zd in extension of the part of the blank Z lying on the bottom side of the holding devices 40 and of the product P. Thereby, for example, the upper film section Zc projects backwards further beyond the product P than the lower film section Zd (see in particular FIGS. 3b and 4b). It can be seen that the film section Zc corresponds to the upper edge of the initially vertically oriented film curtain and that the film section Zd corresponds to the lower edge of the initially vertically oriented film curtain (compare FIG. 1).

As shown in particular in FIGS. 4a to 5b, the holding devices 40 comprise vacuum devices or suction devices for generating a negative pressure on the packaging material film Z in such a way that the packaging material film Z placed around the holding devices 40 can be sucked in by the holding devices 40. For this purpose, the holding devices 40 have, in particular, a connector 44 and a channel 42 for sucking off air as well as openings 46a, 46b, 46c for sucking in the packaging material film Z. The holding devices 40 thereby optionally or cumulatively comprise openings 46a for sucking in the packaging material film Z at the upper side of the holding devices 40, openings 46b for sucking in the packaging material film Z at the bottom side of the holding devices 40, and openings 46c for sucking in the packaging material film Z at the face or front side of the holding devices 40. As long as these vacuum devices are switched on and thus suck air, the packaging material film Z is consequently held by the holding devices 40 so that it cannot shift relative to the product P wrapped in the film Z. This is accomplished over essentially the entire insertion stroke of the holding devices 40 and the product P into the film blank Z. At the end of this insertion stroke, the vacuum devices are turned off, causing the holding devices 40 to release the packaging material film Z so that they can subsequently move away from the product P and back to their initial position.

As noted above, the longitudinal sealing device 80 is positioned behind or downstream at the packaging station 12 to form a longitudinal sealing seam in the film blank Z on the back side of the product P. The longitudinal sealing device 80 is thereby arranged and configured to seal together the two parts Zc, Zd of the film blank Z projecting rearwardly beyond the product over substantially the entire width of the packaging material film Z. Depending on whether the upper film section Zc (as shown in the present FIGS. 3a to 5b) or the lower film section Zd projects further rearwardly beyond the product P, and depending on the respectively appropriate arrangement and design of the longitudinal sealing device 80, the formed longitudinal sealing seam then extends rearwardly substantially in extension of either the upper side or the lower side of the product P with respect to the conveying direction F. After the longitudinal sealing seam has been formed, a part of the longer film section concerned (e.g. a part of section Zc in FIGS. 3a to 5b) lies against the rear side of the product P in a substantially vertical orientation with respect to the conveying direction F, since the longer film section concerned (here Zc) is folded around the product P and placed on the shorter film section (here Zd) and thus sealed. A finished longitudinal sealing seam is not shown in the present figures.

Downstream of the packaging station 12, further sealing devices are typically provided, in particular those for sealing the parts Za, Zb of the film blank Z projecting laterally beyond the product to one another (see FIGS. 1 and 2), in each case forming a side sealing seam. In particular, the parts Za and Zb respectively projecting laterally beyond the product P on the upper side and the bottom side are herein sealed together. Only when the above-mentioned longitudinal sealing seam and these side sealing seams have been formed is the product package completely closed. Further downstream, if necessary, suitable folding devices are then provided which fold the above-mentioned side or longitudinal sealing seams, which initially protrude laterally or rearwardly from the product, respectively, onto the product or the product packaging and fasten them there if necessary, in order to ultimately obtain a clean, visually attractive product packaging.

As mentioned above, at the end of their insertion stroke, i.e. after complete insertion into the film blank Z, the holding devices 40 can move back to their initial position upstream of the packaging station 12, essentially in the opposite direction to the conveying direction F, for a next product P to be packaged. Here it is essential that the holding devices 40 do not collide with the longitudinal sealing device 80, which may be moving at the same time. For this purpose, the holding devices 40 are movably configured and arranged in such a way that, after complete insertion into the film blank Z (cf. position of FIGS. 5a, 5b), they first move laterally outward away from the product P essentially perpendicular to the conveying direction F in the conveying plane, and that they then move essentially in the opposite direction to the conveying direction F back into their starting position upstream of the packaging station 12 (cf. position of FIG. 1). Preferably, the holding devices 40 and the longitudinal sealing device 80 are herein configured and arranged and their movements and paths of movement are coordinated with each other in such a way that the longitudinal sealing device 80 forms the longitudinal sealing seam substantially over the entire width of the packaging material film Z only as soon as or after the holding devices 40 have moved substantially completely out of the area of the packaging material film Z perpendicularly to the conveying direction F. Only then may the longitudinal sealing device 80 shown in the drawings, which is arranged above the conveying plane, move essentially vertically downward into the conveying plane and here come into contact with the respective film sections Zc or Zd projecting beyond the product P and seal them together.

With the above-described apparatus and the corresponding method for packaging products in a packaging material film, in particular a secure holding or fixing of the packaging material film with respect to the product concerned is achieved and it is ensured that the product and the packaging material film surrounding the product are continuously under control and cannot shift or slip individually and/or together with respect to each other and/or with respect to a conveyor track. This also applies in particular to products that have structured or profiled surfaces. Overall, this ensures that the product and the packaging material film are conveyed gently and without stress.

The invention claimed is:

1. An apparatus for packaging plate-shaped or cuboid-shaped products in a food industry in a packaging material film, the apparatus comprising:
feeding devices for feeding one product at a time to a packaging station in a conveying direction in a conveying plane;
guiding devices for providing in the packaging station a blank of the packaging material film matching the respectively fed product, wherein the blank of the packaging material film is fed into the packaging station in a direction substantially perpendicular to the conveying direction;
wherein the feeding devices are configured and arranged to convey the product, respectively, at least partially through the packaging station such that the product is inserted into the blank of the packaging material film in the conveying direction such that the packaging material film substantially wraps around the product;
discharge devices for discharging the product from the packaging station in the conveying direction, wherein the respective blank of the packaging material film remains wrapped around the product;
holding devices being configured and arranged to move in the conveying plane at least partially in the conveying direction with the product through the packaging station, wherein the holding devices hold the respective blank of the packaging material film being wrapped around the product in a predetermined orientation and arrangement with respect to the respective product, wherein the holding devices are movably configured and arranged to hold the product in a predetermined orientation and arrangement with respect to the conveying plane while the product is conveyed through the packaging station in that the holding devices hold the respective blank of the packaging material film placed around the product in a predetermined orientation and arrangement with respect to the respective product, and wherein the holding devices do not contact the product.

2. The apparatus according to claim 1, wherein the holding devices are arranged substantially in the conveying plane next to the product on at least one side of the product extending substantially in the conveying direction.

3. The apparatus according to claim 1, wherein the holding devices have a height measured perpendicular to the conveying plane substantially corresponding to a height of the product measured perpendicular to the conveying plane.

4. The apparatus according to claim 1, wherein the blank of the packaging material film is dimensioned and arranged with respect to the product in such a way that, on two sides of the product extending substantially in the conveying direction, the blank projects beyond the product on each of the two sides of the product with a part of the blank perpendicular to the conveying direction.

5. The apparatus according to claim 1,
wherein the blank of the packaging material film is dimensioned and arranged with respect to the product in such a way that, on two sides of the product extending substantially in the conveying direction, an upper part and a lower part of the blank projects beyond the product on each of the two sides of the product, and the upper and lower parts of the blank extend rearwardly beyond a rear side of the product, and the apparatus further comprising at least one sealing device for sealing the upper part of the blank of the packaging material film to the lower part of the blank of the packaging material film at least at one of the two sides of the product or the rear side of the product, thereby forming a sealing seam, in such a way that the product is at least partially packaged in the packaging material film.

6. The apparatus according to claim 5, further comprising a longitudinal sealing device for sealing a longitudinal sealing seam running perpendicular to the conveying direction, the longitudinal sealing device being arranged and configured in the conveying direction behind or downstream of the packaging station such that the upper and lower parts of the blank of the packaging material film projecting rearwardly beyond the product are sealed together substantially over the entire width of the packaging material film.

7. The apparatus according to claim 6, wherein the longitudinal sealing device is configured such that the formed longitudinal sealing seam extends substantially in extension of either an upper side or a lower side of the product rearwardly with respect to the conveying direction, wherein a portion of one of the upper or lower parts of the blank of the packaging material film lies substantially on the rear side of the product.

8. The apparatus according to claim 1, wherein the holding devices are movably configured and arranged in such a way that, after the one product has been fully inserted in the conveying direction into the blank of the packaging material film, for a next product to be packaged, the holding devices are configured to move back, substantially opposite to the conveying direction, to an initial position upstream of the packaging station.

9. The apparatus according to claim 8, wherein the holding devices are movably configured and arranged in such a way that during movement back to the initial position upstream of the packaging station, the holding devices do not collide with a longitudinal sealing device for sealing a longitudinal sealing seam running perpendicular to the conveying direction, the longitudinal sealing device being arranged and configured in the conveying direction behind or downstream of the packaging station.

10. The apparatus according to claim 1, wherein the feeding devices are configured to intermittently or continuously feed successive products to the packaging station, and wherein the discharge devices are configured to intermittently or continuously discharge the products from the packaging station.

11. The apparatus according to claim 10, wherein the feeding devices are selected from the group consisting of reciprocating pushing devices, revolving pushing devices, reciprocating rake conveying devices, revolving rake conveying devices, revolving belt or chain conveying devices, with carriers engaging the rear side of the product, with respect to the conveying direction, for feeding the respective product to the packaging station, and wherein the discharge devices are selected from the group consisting of reciprocating pushing devices, revolving pushing devices, reciprocating rake conveying devices, revolving rake conveying devices, revolving belt or chain conveying devices, with carriers engaging the rear side of the product, with respect to the conveying direction, for discharging the respective product from the packaging station.

12. The apparatus according to claim 1, wherein the packaging material film is configured to feed as an endless belt to the packaging station, wherein the guiding devices for providing the blank of the packaging material film comprise cutting devices each configured to cut off from the endless belt a blank of the packaging material film matching the respective product to be packaged.

13. A method for packaging substantially plate-shaped or cuboid-shaped products in the food industry using the apparatus according to claim 1.

14. An apparatus for packaging plate-shaped or cuboid-shaped products in a food industry in a packaging material film, the apparatus comprising:
feeding devices for feeding one product at a time to a packaging station in a conveying direction in a conveying plane;
guiding devices for providing in the packaging station a blank of the packaging material film matching the respectively fed product, wherein the blank of the packaging material film is fed into the packaging station in a direction substantially perpendicular to the conveying direction;
wherein the feeding devices are configured and arranged to convey the product, respectively, at least partially through the packaging station such that the product is inserted into the blank of the packaging material film in the conveying direction such that the packaging material film substantially wraps around the product;
discharge devices for discharging the product from the packaging station in the conveying direction, wherein the respective blank of the packaging material film remains wrapped around the product;
holding devices being configured and arranged to move in the conveying plane at least partially in the conveying direction with the product through the packaging station, wherein the holding devices hold the respective blank of the packaging material film being wrapped around the product in a predetermined orientation and arrangement with respect to the respective product, wherein the holding devices are arranged substantially in the conveying plane next to the product, wherein the holding devices are arranged on two opposing sides of the product extending substantially in the conveying direction.

15. An apparatus for packaging plate-shaped or cuboid-shaped products in a food industry in a packaging material film, the apparatus comprising:
feeding devices for feeding one product at a time to a packaging station in a conveying direction in a conveying plane;
guiding devices for providing in the packaging station a blank of the packaging material film matching the respectively fed product, wherein the blank of the packaging material film is fed into the packaging station in a direction substantially perpendicular to the conveying direction;
wherein the feeding devices are configured and arranged to convey the product, respectively, at least partially through the packaging station such that the product is inserted into the blank of the packaging material film in the conveying direction such that the packaging material film substantially wraps around the product;
discharge devices for discharging the product from the packaging station in the conveying direction, wherein the respective blank of the packaging material film remains wrapped around the product;
holding devices being configured and arranged to move in the conveying plane at least partially in the conveying direction with the product through the packaging station, wherein the holding devices hold the respective blank of the packaging material film being wrapped around the product in a predetermined orientation and arrangement with respect to the respective product, wherein the blank of the packaging material film is dimensioned and arranged with respect to the product in such a way that, on two sides of the product extending substantially in the conveying direction, the blank projects beyond the product on each of the two sides of the product with a part of the blank perpendicular to the conveying direction, wherein the holding devices each have a width in the conveying plane substantially corresponding to a width of the respective part of the blank projecting beyond the product on each of the two sides of the product.

16. An apparatus for packaging plate-shaped or cuboid-shaped products in a food industry in a packaging material film, the apparatus comprising:
feeding devices for feeding one product at a time to a packaging station in a conveying direction in a conveying plane;
guiding devices for providing in the packaging station a blank of the packaging material film matching the respectively fed product, wherein the blank of the packaging material film is fed into the packaging station in a direction substantially perpendicular to the conveying direction;
wherein the feeding devices are configured and arranged to convey the product, respectively, at least partially through the packaging station such that the product is inserted into the blank of the packaging material film in the conveying direction such that the packaging material film substantially wraps around the product;
discharge devices for discharging the product from the packaging station in the conveying direction, wherein the respective blank of the packaging material film remains wrapped around the product;
holding devices being configured and arranged to move in the conveying plane at least partially in the conveying direction with the product through the packaging station, wherein the holding devices hold the respective blank of the packaging material film being wrapped around the product in a predetermined orientation and arrangement with respect to the respective product, wherein the holding devices are configured to be inserted into the blank of the packaging material film together with the product in the conveying direction in such a way that the packaging material film substantially wraps around the holding devices and around the product such that a first part of the blank of the packaging material film lies substantially on an upper side of the holding devices and the product with respect to the conveying plane, that a second part of the blank of the packaging material film lies substantially on a lower side of the holding devices and the product with respect to the conveying plane, and that a third part of the blank of the packaging material film lies substantially on a front side of the holding devices and the product with respect to the conveying direction.

17. The apparatus according to claim 16, wherein the apparatus is configured so that at an end of the insertion of the holding devices and the product in the conveying direction into the blank of the packaging material film, a fourth part of the blank extending from the first part of the blank, and a fifth part of the blank extending from the second part of the blank each project substantially rearwardly beyond the product with respect to the conveying direction in extension.

18. The apparatus according to claim 17, wherein one of the fourth or fifth parts of the blank of the packaging material film projecting rearwardly beyond the product projects further rearwardly beyond the product than the other of the fourth or fifth part of the blank of the packaging material film projecting rearwardly beyond the product.

19. An apparatus for packaging plate-shaped or cuboid-shaped products in a food industry in a packaging material film, the apparatus comprising:
- feeding devices for feeding one product at a time to a packaging station in a conveying direction in a conveying plane;
- guiding devices for providing in the packaging station a blank of the packaging material film matching the respectively fed product, wherein the blank of the packaging material film is fed into the packaging station in a direction substantially perpendicular to the conveying direction;
- wherein the feeding devices are configured and arranged to convey the product, respectively, at least partially through the packaging station such that the product is inserted into the blank of the packaging material film in the conveying direction such that the packaging material film substantially wraps around the product;
- discharge devices for discharging the product from the packaging station in the conveying direction, wherein the respective blank of the packaging material film remains wrapped around the product;
- holding devices being configured and arranged to move in the conveying plane at least partially in the conveying direction with the product through the packaging station, wherein the holding devices hold the respective blank of the packaging material film being wrapped around the product in a predetermined orientation and arrangement with respect to the respective product, wherein the holding devices comprise openings for generating a negative pressure on the packaging material film in such a way that the packaging material film is sucked by the holding devices.

20. The apparatus according to claim 19, wherein the holding devices have a connection and a channel for sucking off air.

21. The apparatus according to claim 20, wherein the openings for sucking the packaging material film are arranged at least at one side of the holding device, the at least one side of the holding device selected from the group consisting of an upper side, a lower side and a front side.

22. An apparatus for packaging plate-shaped or cuboid-shaped products in a food industry in a packaging material film, the apparatus comprising:
- feeding devices for feeding one product at a time to a packaging station in a conveying direction in a conveying plane;
- guiding devices for providing in the packaging station a blank of the packaging material film matching the respectively fed product, wherein the blank of the packaging material film is fed into the packaging station in a direction substantially perpendicular to the conveying direction;
- wherein the feeding devices are configured and arranged to convey the product, respectively, at least partially through the packaging station such that the product is inserted into the blank of the packaging material film in the conveying direction such that the packaging material film substantially wraps around the product;
- discharge devices for discharging the product from the packaging station in the conveying direction, wherein the respective blank of the packaging material film remains wrapped around the product;
- holding devices being configured and arranged to move in the conveying plane at least partially in the conveying direction with the product through the packaging station, wherein the holding devices hold the respective blank of the packaging material film being wrapped around the product in a predetermined orientation and arrangement with respect to the respective product, wherein the holding devices are movably configured and arranged in such a way that, after the one product has been fully inserted in the conveying direction into the blank of the packaging material film, for a next product to be packaged, the holding devices are configured to move back, substantially opposite to the conveying direction, to an initial position upstream of the packaging station, wherein the holding devices are movably configured and arranged in such a way that during movement back to the initial position upstream of the packaging station, the holding devices do not collide with a longitudinal sealing device for sealing a longitudinal sealing seam running perpendicular to the conveying direction, the longitudinal sealing device being arranged and configured in the conveying direction behind or downstream of the packaging station, wherein the holding devices are movably configured and arranged in such a way that, after being fully inserted in the conveying direction into the blank of the packaging material film, the holding devices are configured to first move substantially perpendicularly to the conveying direction in the conveying plane laterally outwards away from the product, and then move substantially opposite to the conveying direction back into their initial position upstream from the packaging station.

23. The apparatus according to claim 22, wherein the holding devices and the longitudinal sealing device are configured and arranged in such a way that the longitudinal sealing device forms the longitudinal sealing seam substantially over the entire width of the packaging material film after the holding devices have moved substantially perpendicularly to the conveying direction in the conveying plane substantially completely out of the region of the packaging material film.

* * * * *